United States Patent [19]
Spitz

[11] Patent Number: 6,036,091
[45] Date of Patent: *Mar. 14, 2000

[54] METHOD AND APPARATUS SUPPORTING HIGH SPEED EVALUATION OF BAR CODE INDICIA

[75] Inventor: Glenn Steven Spitz, Northport, N.Y.

[73] Assignee: Webscan, Inc., Brentwood, N.Y.

[*] Notice: This patent is subject to a terminal disclaimer.

[21] Appl. No.: 08/782,905

[22] Filed: Jan. 11, 1997

Related U.S. Application Data

[63] Continuation-in-part of application No. 08/575,097, Dec. 19, 1995, Pat. No. 5,633,488.

[51] Int. Cl.[7] .................................................. G06K 7/10
[52] U.S. Cl. ................................... 235/462; 235/463
[58] Field of Search ................................. 235/462, 463, 235/466, 470

[56] References Cited

U.S. PATENT DOCUMENTS

| | | | |
|---|---|---|---|
| 4,219,152 | 8/1980 | Couch et al. | 235/463 |
| 4,251,798 | 2/1981 | Swartz et al. | 235/462 |
| 4,517,455 | 5/1985 | Benitez, III et al. | 235/463 |
| 4,705,939 | 11/1987 | Ulinski, Sr. | 235/466 |
| 4,740,675 | 4/1988 | Brosnan et al. | 235/462 |
| 4,980,544 | 12/1990 | Winter | 235/436 |
| 5,103,080 | 4/1992 | Barken | 235/437 |
| 5,194,720 | 3/1993 | Reinnagel et al. | 235/437 |
| 5,218,190 | 6/1993 | Hardesty et al. | 235/462 |
| 5,231,293 | 7/1993 | Longacre | 250/568 |
| 5,285,056 | 2/1994 | Tedesco et al. | 235/472 |
| 5,294,783 | 3/1994 | Hammond, Jr. et al. | 235/462 |
| 5,298,728 | 3/1994 | Elliott et al. | 235/463 |
| 5,308,962 | 5/1994 | Havens et al. | 235/455 |
| 5,326,961 | 7/1994 | Sibata | 235/463 |
| 5,334,825 | 8/1994 | Maddox | 235/437 |
| 5,410,139 | 4/1995 | Barken | 235/462 |
| 5,484,994 | 1/1996 | Roustaei | 235/462 |
| 5,663,488 | 9/1997 | Spitz | 235/462 |

OTHER PUBLICATIONS

Uniform Code Council, "Quality Specification for the UPC Printed Symbol", Sep. 1994.
American National Stndards Institute (ANSI), "Bar Code Print Quality Guideline", ANSI X3.182—1990, Mar. 1990.

*Primary Examiner*—Michael G. Lee
*Attorney, Agent, or Firm*—Island Patent Associates

[57] ABSTRACT

A method and apparatus supporting the high speed evaluation of the quality of a bar code indicia by processing a scan reflectance profile signal generated by a scanner unit. The scan reflectance profile signal may be sampled by an analog-to-digital converter, wherein the sample values produced are processed in real-time to determine all occurring peak sample values, including all positive peak sample values and all negative peak sample values, for each element of the bar code indicia. The peak sample values determined, including at least one peak value for each element, are made accessible for post-processing to determine appropriate figures of merit indicative of the quality of the bar code indicia being evaluated. The samples produced by the a/d converter are processed as they are generated to filter and reduce the total collection of samples values stored, while still providing the critical values for the scanned elements to support high speed verification of the quality of bar code indicia.

29 Claims, 9 Drawing Sheets

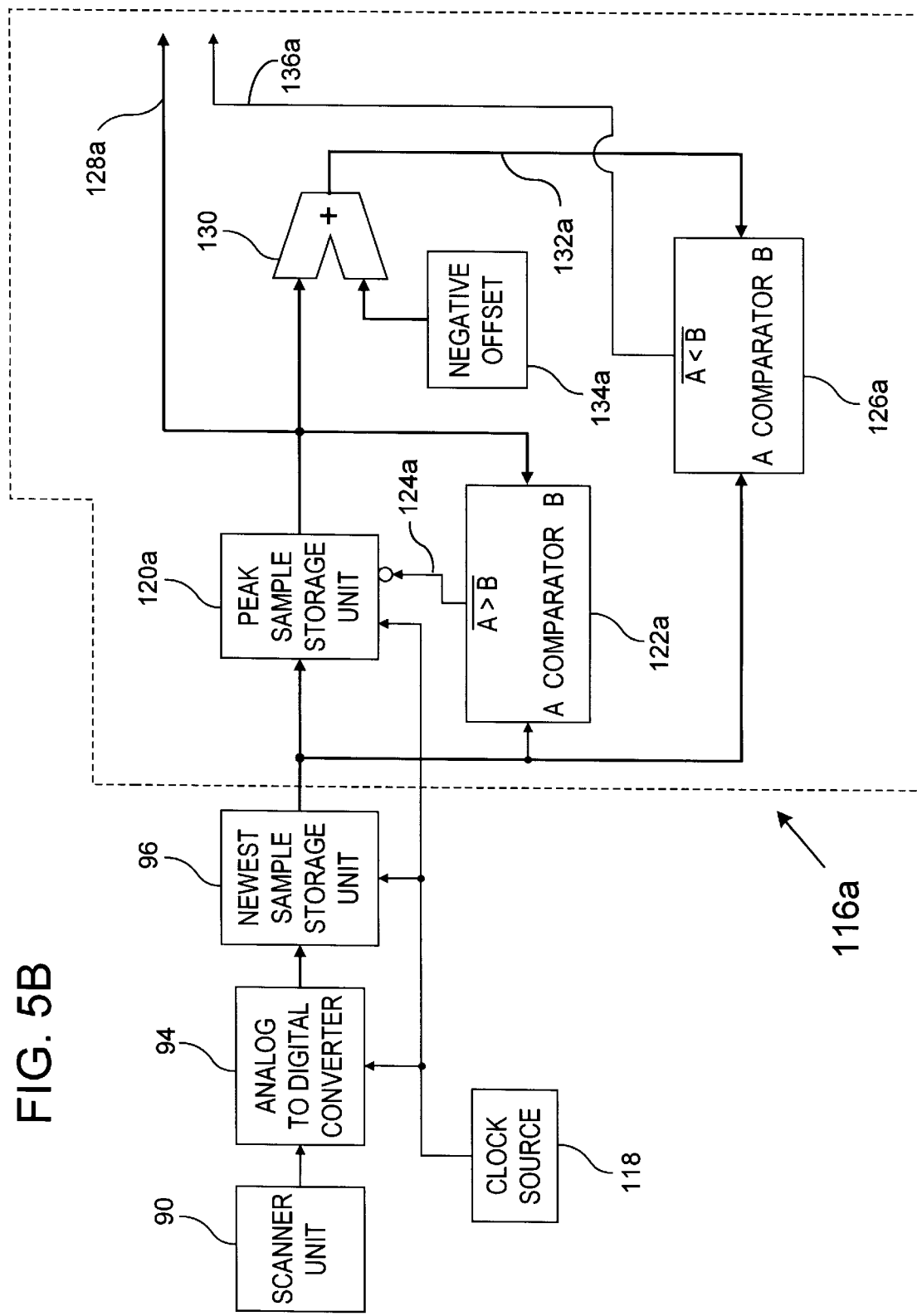

METHOD AND APPARATUS SUPPORTING HIGH SPEED EVALUATION OF BAR CODE INDICIA

This is a continuation-in-part (CIP) of application Ser. No. 08/575,097 filed on 12/19/95, which is now U.S. Pat. No. 5,633,488.

BACKGROUND OF THE INVENTION

1. Field of the Invention

The present invention relates to the evaluation of the quality of bar code indicia and, more particularly, to a method and apparatus to enable high speed evaluation and verification of bar code indicia by processing scan reflectance profile signals in real-time.

2. Description of the Prior Art

At present bar code indicia are found in a wide range of applications and industries. Virtually every retail product marketed in supermarkets, retail stores, discount outlets, as well as many other establishments, utilize bar code symbols at their point-of-sale terminals, to monitor inventory levels, to generate orders for low inventory items, etc. Shipping companies rely heavily on the use of bar code indicia to monitor the location and status of packages in transit. Further, bar code indicia are universally employed in most countries around the world.

A large number of varied printing techniques are employed to apply bar code indicia to packages and containers. In all cases there is a need to verify the quality of the resulting indicia. Considerations such as the decodability, symbol contrast, first read rate (FRR), substitution error rate (SER), and others, are of critical importance when evaluating the quality of bar code indicia.

Bar code verification systems are well known in the art. Typically, these systems produce an analog signal known as a scan reflectance profile signal, or simply the scan reflectance signal, which is representative of the elements of the bar code indicia. The scan reflectance signal is often sampled, by a device such as an analog-to-digital converter, to produce a collection of sample values (fully) representative of the entire scan reflectance profile signal that are stored in a memory unit. The entire collection of sample values is generally very large and must be completely processed to evaluate the quality of the bar code indicia. Systems utilizing this method, wherein the entire scan reflectance profile signal is sampled and the sample values stored in memory, require a large sample memory. In addition, these systems are processor intensive, essentially requiring the entire processing power of the system CPU during sample processing and analysis. As a result, systems of this type are generally not capable of supporting real-time, or near real-time, high speed verification. This is especially the case where state-of-the-art ultra high evaluation speeds are desired.

An example of an application where a high speed (essentially real-time) evaluation and verification system would be desired is a system employed during the automated filling of a container on a conveyor line, wherein a bar code indicia is printed on the container. In this case verification in real-time is desired to detect when problems arise in the bar code printing process—at which point the line may be stopped to correct the problem. Generally in situations where full 100% verification is required, very high cost verifiers are employed, or the speed of the conveyor or assembly line is reduced accordingly.

Other systems are known that begin to process data samples as they are being generated and loaded into memory structures such as a first-in-first-out (FIFO) memory. Although, these systems decrease the time required for evaluation and verification of bar code indicia by overlapping in time the steps of generating sample values and processing sample values, they still require relatively large amounts of sample memory and consume most available CPU processing power. Again, due to the large number of sample values that must be processed and analyzed, they too are generally not capable of supporting high speed real-time verification.

At present, several standard guidelines have been established to quantitatively evaluate the quality of bar code indicia. Two such guidelines have been defined by the American National Standards Institute (ANSI), and the Uniform Code Council (UCC). The ANSI guideline (ANSI X3.182-1990) is titled "Bar Code Print Quality Guideline". The UCC guideline is titled "Quality Specification for the UPC Printed Symbol" (September 1994). The ANSI and UCC documents are hereby incorporated by reference. In particular, the ANSI document provides in section 4 measurement methodologies and related information, while parts 2 and 3 of the UCC document provide definitions and related measurement subject matter. These two documents define a number of figures of merit which can be determined from the sampled scan reflectance profile signal. However, since each guideline defines an entire procedure for evaluation, and further requires a succession of scans taken at equally spaced locations within an "interrogation window" along the height of the elements forming the bar code indicia, they have placed further demands on systems which are utilized to evaluate and verify the printed and general quality of bar code indicia. It is no longer the case where a few simple checks, such as decodability and scan contrast may be employed to determine the quality of indicia.

With the advent of rigorous and well defined quantitative measures to evaluate bar code indicia, such as the common UPC bar code symbol, there is a need for improved methods and associated apparatus to support evaluation and verification, particularly in real-time where 100% verification is desired. Objects of the present invention are, therefore, to provide new and improved methods and apparatus to support evaluation and verification of bar code indicia having one or more of the following capabilities, features, and/or characteristics:

- enable high speed evaluation and verification of bar code indicia;
- process reflectance data samples as they (the samples) are generated in order to store in memory, or generally make available, only the critical peak samples that are necessary for various quantitative evaluation;
- capture critical samples, along with associated and related data, which will support the generation of a recreation of an approximate graphical representation of one or more portions of the scan reflectance profile signal originally produced by scanning the indicia;
- enable the detection and quantification of indicia defects as the indicia are being printed;
- support 100% (essentially) real-time verification in demanding applications;
- significantly reduce the amount of sample memory required to store samples collected;
- reduce the processing overhead (including processing time and CPU utilization) required to enable high speed evaluation; and
- relatively low cost implementation using many components and devices readily available.

SUMMARY OF THE INVENTION

In accordance with the invention, a method and apparatus are disclosed to enable high speed evaluation and verification of bar code indicia. The method for evaluating and verifying the quality of a bar code indicia is provided by processing a scan reflectance profile signal representative of the elements of the indicia. The scan reflectance profile signal is generated by scanning the indicia. The method includes the step of sampling the scan reflectance signal to provide a sequence of sample values representative of each element of the bar code indicia, and further provides for the processing of the sequence of sample values as they are produced to determine each peak sample value occurring for each element of the bar code indicia. The plurality of peak sample values, wherein there are included positive and negative peak sample values, are accessible for post-processing to determine at least one figure of merit indicative of the quality of the bar code indicia.

The apparatus for evaluating and verifying the quality of a bar code indicia processes a scan reflectance profile signal generated by a scanner unit and representative of the elements of the bar code indicia. An analog-to-digital converter produces the sequence of samples, wherein each sample value is representative of the instantaneous analog value of the scan reflectance signal (at the point in time the sample is produced). An edge detection unit is included to detect edges present in the scan reflectance profile of the bar code indicia being evaluated. The edges are indicative of the start and possibly the end of elements forming the indicia. A peak sample determining unit is employed to determine all occurring peak sample values produced by the analog-to-digital converter for each element of the indicia. The peak sample values associated with already processed elements are accessible to begin post-processing to determine at least one figure of merit indicative of the quality of the bar code indicia.

Another embodiment of the present invention supports the providing of time markers for each peak sample value determined to indicate the relative temporal position of each associated peak values within the portion of the scan reflectance profile signal representative of one or more scanned elements.

For a better understanding of the invention, together with other and further objects and features, reference is made to the accompanying drawings and the related detailed description, with the scope of the invention pointed out in the appended claims.

BRIEF DESCRIPTION OF THE DRAWINGS

In the drawings, like elements are assigned like reference numerals. The drawings are briefly described as follows.

FIG. 5B is a functional block diagram of an embodiment of a positive peak determining unit to collect a positive peak sample value employing a digital peak detection approach.

DETAILED DESCRIPTION OF THE INVENTION

Figure 1A:
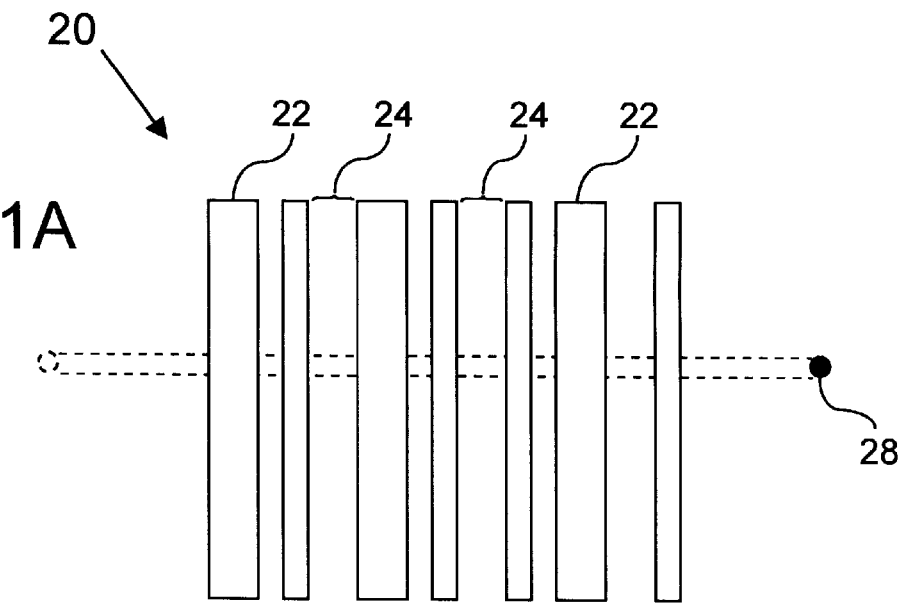
FIGS. 1A and 1B illustrate, respectively, an ideal bar code indicia and a corresponding ideal scan reflectance profile signal.

Referring now to FIG. 1A, there is illustrated an ideal bar code indicia 20 comprised of a number of bars 22, and spaces 24 disposed therebetween. Together, the bars 22 and the spaces 24 provide the information carrying and decodable elements of the bar code indicia 20. By scanning the elements of the bar code indicia 20 using a scanner unit a scan reflectance profile signal is generated. Scanning devices, such as optical laser scanners, are well known in the art. These devices are readily available in varying forms from a number of manufacturers.

Figure 1B:
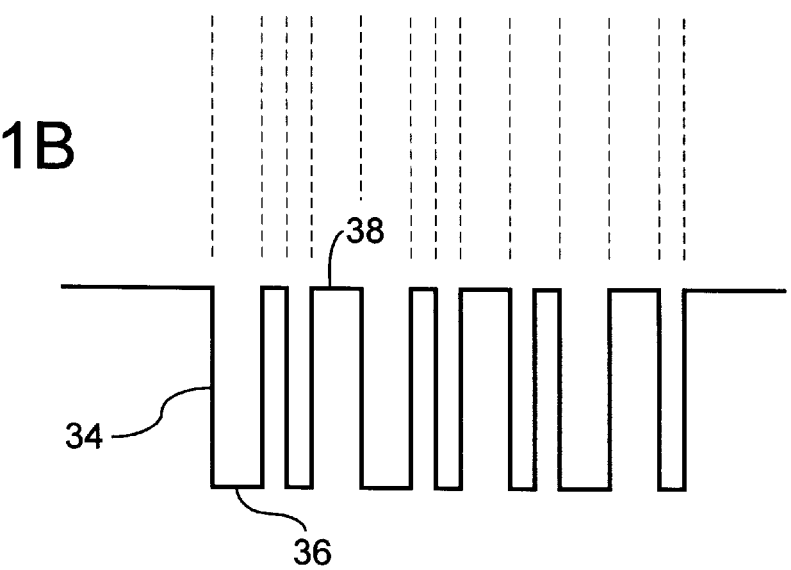

A typical scanner unit sweeps a laser beam spot 28 at nearly constant velocity across the bar code indicia 20, from left to right as shown in FIG. 1A, and produces in real-time a scan reflectance profile signal such as that shown in FIG. 1B. The idealized nature of the scan reflectance profile in FIG. 1B is characterized by the very sharp vertical edges, such as edge 34, and the very flat horizontal portions therebetween, such as reflectance level 36. It can be noted that the reflectance level 36, which represents the level of reflected light associated with a bar, is equal to the reflectance level of each bar of an idealized indicia. A level such as level 36 is defined as a negative peak value. It can also be noted that all negative peaks, such as 36 are considered lowest negative peaks, as all the negative peaks have the same minimum reflectance. Further, the level 38, which indicates the level of reflected light associated with a space, is equal to the level of reflectance for each space in an idealized indicia/profile. A level such as level 38 is defined as a positive peak value.

Figure 2:
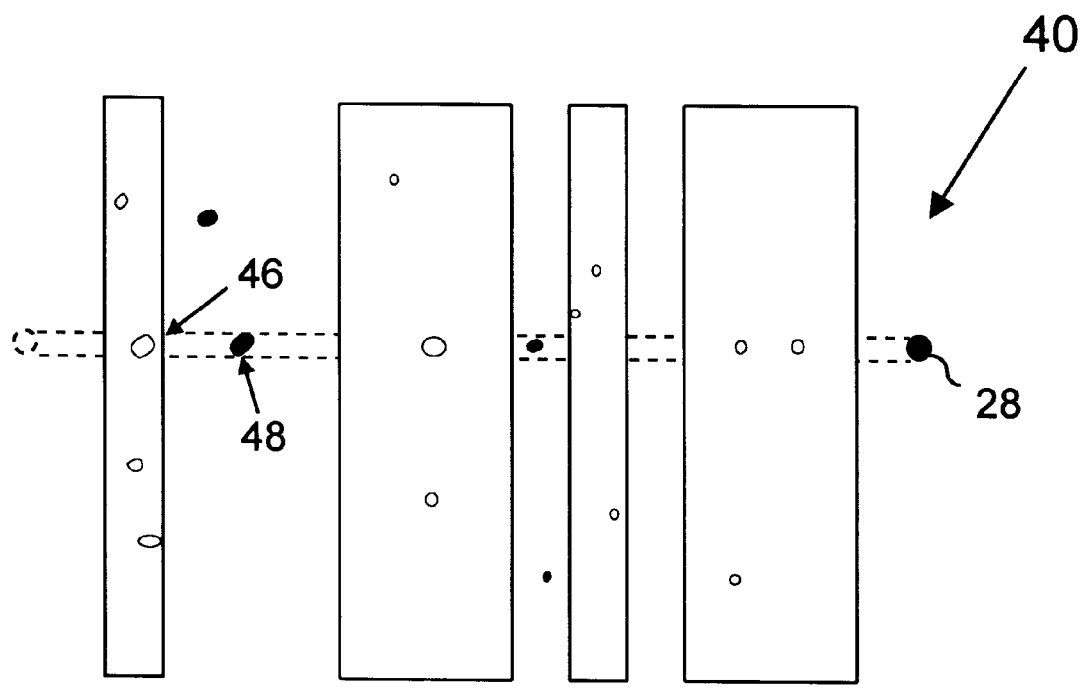
FIG. 2 depicts a portion of a non-ideal bar code indicia, along with a scan reflectance profile signal representative of the non-ideal indicia.

Referring now to FIG. 2 there is shown a portion of a non-idealized bar code indicia 40 and its representative scan reflectance profile signal 44. The enlarged elements of bar code indicia 40 are depicted with voids, such as void 46 (of the left most bar element), and with spots, such as spot 48. These kinds of print errors manifest themselves as spikes and dips when a scan reflectance profile signal 44 is generated with a scanner unit having appropriate operating characteristics. Imperfections such as negative peak 50 and positive peak 52, whether associated with a bar element or a space element, may reduce the ability of a bar code reader to properly interpret a bar code indicia. For example, a drop in the first-read rate may result, or worse yet, a substitution error may occur (i.e. an incorrect interpretation of the actual bar code indicia's encoded digits). Methods and apparatus, such as those of the present invention, are useful when employed to evaluate the quality of printed bar code indicia, and detect and quantify such defects.

For completeness, and to illustrate an important aspect of the invention, it will be helpful to define several key terms used to describe and discuss scan reflectance profile signals, as well as introduce several common figures of merit used to quantitatively evaluate and verify bar code indicia.

R(max): The largest value of reflectance for an entire scan reflectance profile signal.

R(min): The smallest value of reflectance for an entire scan reflectance profile signal.

R(b): The smallest value of reflectance within a bar element.

R(s): The largest value of reflectance within a space element.

Figure 3:
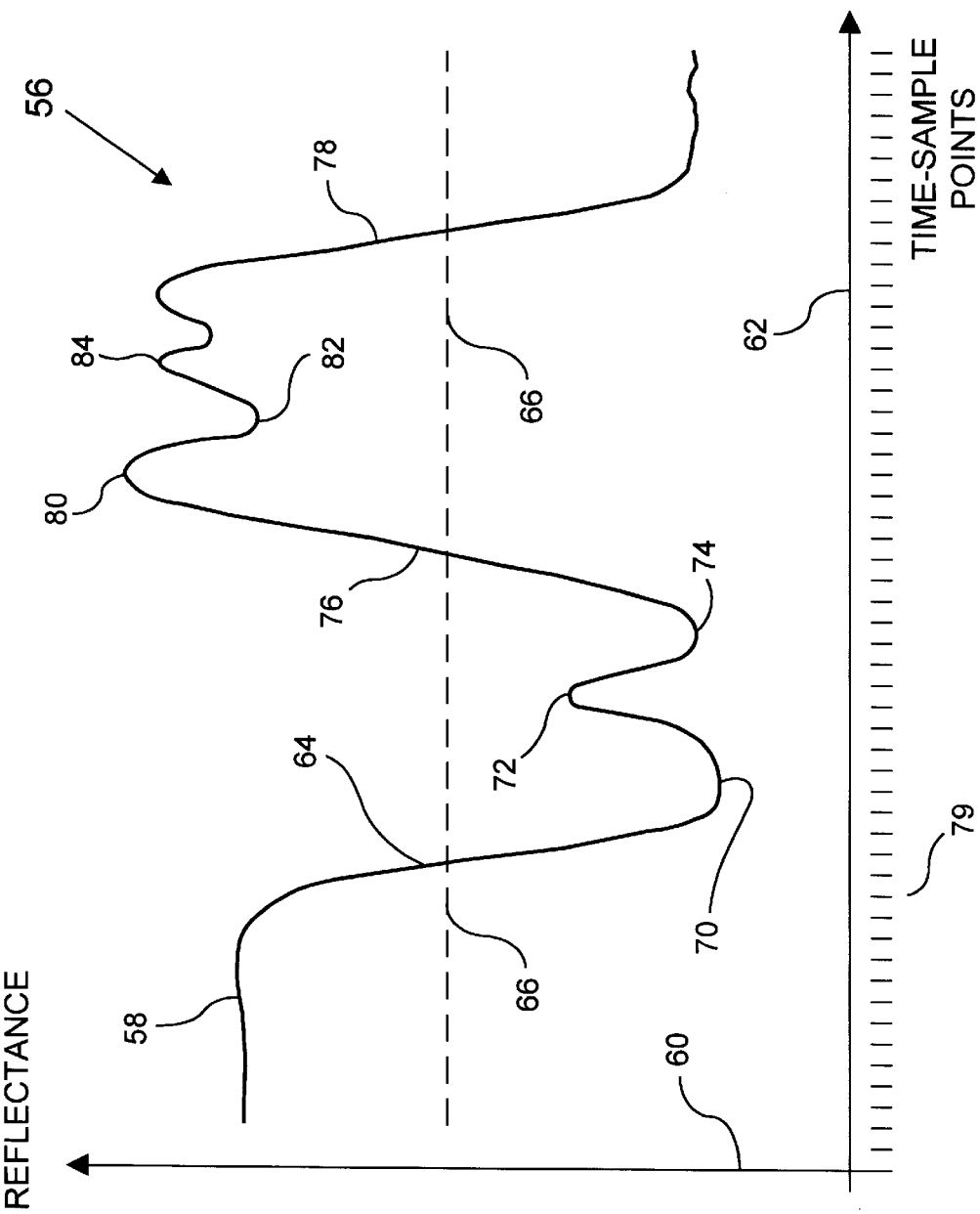
FIG. 3 is an enlarged view of a portion of a typical scan reflectance profile signal showing critical points of interest (along with associated and related items) when performing indicia evaluation.

Global Threshold: A line which may be defined midway between R(max) and R(min), and can be utilized to determine a transition point between bars and spaces. Those portions of the scan reflectance signal which are above a global threshold line are representative of spaces, while those portions below are representative of bars. An example of a global threshold level 66 is illustrated in FIG. 3.

As discussed herein, the scan reflectance profile signal 44 of FIG. 2, which is generated by a scanner unit, is very often sampled and converted to a series of numerical sample values. The entire collection of sample values are stored in memory, as they are produced, and generally processed at a later time to determine at least one commonly employed quantitative figure of merit that is indicative of the quality of the bar code indicia.

It is important to note that the terms (and quality items) discussed above, as well as others, may be determined by simply collecting the sample values corresponding to the positive and negative peaks of the scan reflectance signal associated with the indicia being evaluated. That is, rather than capturing a complete collection of all sample values representative of the entire (complete) scan reflectance profile for an element, a typically small number of "peak" values comprised of the positive and negative peak (reflectance data) sample values for each element will suffice. Indeed, a possibly most preferred method providing the highest speed evaluation is a method (and apparatus) wherein only the highest positive and lowest negative peak values for each element scanned are stored and employed for quality evaluation of the indicia under scrutiny. The collection of peak values for each element, as described above, when combined with a width count value indicative the width of each element, will allow virtually all the figures of merit to be determined that are commonly used to quantitatively assess the quality of bar code indicia.

Several examples of common figures of merit include symbol contrast (SC), edge contrast (EC), modulation, element reflectance nonuniformity (ERN), and decodability. The symbol contrast figure of merit is determined by subtracting R(min) from R(max). Edge contrast is determined for each element by taking the difference between R(s) and R(b) for adjacent elements, including the quiet zones. (For the purposes of this disclosure and related discussions, the quiet zones will be considered elements along with the bars and spaces forming the bar code indicia. However, the quiet zones will typically not provide peak sample values of importance for indicia evaluation.) Element reflectance nonuniformity, or ERN, is a quantitative figure of merit indicative of defects of the indicia, such as spots and voids. ERN is typically determined by taking the difference between the highest positive peak value and the lowest negative peak value within each individual element of the indicia. A defect factor may then be determined by dividing the highest ERN by the SC. If desired, the next highest and/or lowest peaks may be employed to determine secondary or "next worst" defects and quality parameter values (e.g. the next worst case ERN). Further, if a time marker indicating the approximate (and/or relative) temporal position of each determined peak value is provided, it is possible to recreate an approximate graphical representation of one or more portions of the SRP signal originally generated by the scanning unit. Such a recreation may be realized, for example, via a display unit included with a post-processing computer, and would allow the visual inspection of at least one portion of the SRP signal to be made by interested persons.

The ANSI and UCC print quality guidelines additionally provide for the assigning of grades to items such as the symbol contrast, as well as most other figures of merit. The grade may be provided in the form of a "numerical grade" and/or a "letter grade" and is assigned to easily quantify most figures of merit. A more complete presentation of all current figures of merit commonly employed to quantitatively evaluate bar code indicia can be found in the ANSI and UCC documents incorporated by reference (in the background section). The term "figure of merit" is to be defined for the purposes of this disclosure to indicate any possible quantitative figure of merit which is included in the ANSI and UCC documents and can be determined by the processing of the positive and negative peak sample values for each element, along with an associated width count (for each element). The collection and application of width counts will be addressed in greater detail below when referring to FIG. 3.

Referring now to FIG. 3 there is illustrated an enlarged view of a portion of a generalized scan reflectance profile signal 56. An analysis of this scan reflectance signal will better define the meaning of a positive peak sample value and a negative peak sample value, as well as the meaning of a highest positive peak sample value and a lowest negative peak sample value. Also, an outline of the method employed for the operation of the apparatus of the invention will be provided. Included in FIG. 3 are a pair of orthogonal axes with the horizontal axis 62 representing increasing time (from left to right) and the vertical axis 60 represents the relative level of reflectance as indicated by the scan reflectance signal (decreasing from top to bottom). It may be assumed that this portion of the scan reflectance signal 56 is representative of the first two elements of a bar code indicia. It may further be assumed that a scanning spot (not shown) is sweeping from left to right across several elements of the bar code indicia to generate this portion of the scan reflectance profile signal.

A first level 58 of the scan reflectance profile 56 is known as a quiet zone and is a blank, white region located adjacent to the first bar of the indicia. A first edge 64 indicates the scanning spot produced by a scanner unit is sweeping across the indicia and moving from the quiet zone onto the first bar of the bar code indicia. The corresponding level of reflectance, therefore, will drop from a relatively high level to a relatively low level as the amount of light reflected from the dark bar is low with respect to the bright quiet zone. This edge, as well as other edges within the scan reflectance signal, may be detected by a number of approaches well known in the art. For example, edges may be detected comparing the current sample value produced by an analog-to-digital converter to a previously established global threshold value, such as level 66, as shown in FIG. 3. Another method know in the art for detecting edges is to locate zero crossings of the second derivative of the scan reflectance signal. Skilled persons will appreciate the variety of approaches that may be employed using either analog or digital techniques to detect edges such as edge 64. If the scan reflectance signal is sampled as the scan reflectance profile is generated, sample values may be processed (or pre-processed) to determine the values of one or more negative peak values, such as 70 or 74, and/or one or more positive peak values, such as 72, within the current bar element. Also, a most preferred operation is to determine only the lowest negative peak 70 and a highest positive peak 72 within the current bar element. It may be noted that peak 74 represents a negative peak value, but is not the lowest negative peak for this first element—peak 70 has that distinction. As addressed above, peak 74 may be employed to determine secondary and "next worst" quality parameter values and figure of merits. The process of comparing samples (as they are collected) to determine positive and negative peak sample values continues until edge 76 is detected. At this point the peak values 70, 72, and 74 may then be (or have been) stored in a memory unit, or could be made available for immediate post-processing activities. The post-processing activities carried out by a post-processing computer would use peak (sample) values such as 70, 72, and 74, to begin to determine at least one figure of merit indicative of the quality of the bar code indicia. The system would next begin evaluating samples in the same manner to determine the positive peak sample values and the negative peak sample values (as the element is scanned) for the following element represented by the portion of the scan reflectance signal between edge 76 and edge 78. That is, the peak sample values associated with peaks 80, 82, and 84 would next be determined, respectively, as shown in FIG. 3. Note, that peaks 80 and 84 represent positive peak values, with peak 80 being the most positive peak (sample) value, and negative peak 82 is the only negative peak, and therefore by default the lowest negative peak value for that element. The process of determining peak sample values repeating for each element forming the remainder of the bar code indicia being evaluated. It must, therefore, be understood the terms "peak values" and "peak sample values" are to be defined as the collection of all positive and negative peak sample values present within the scan reflectance profile signal, or within a portion of the SRP signal, as indicated in the context within which said phrase (s) are used. These peak values may also be termed "all occurring peak sample values", for each element or indicia, as determined by the context in which the phrase is employed.

It must be noted that the advantage of processing sample values as they are produced to determine the peak sample values for each element of the bar code indicia is to significantly reduce, by one or more orders of magnitude, the amount of sample memory required by an evaluation and verifying system. In addition, the CPU does not need to "filter" the important peak value points from a large and complete collection of sample values—thereby significantly reducing the required processing overhead, or alternately, the length of time needed to post-process the samples actually collected. Accordingly, systems employing the above "peak sample collecting" approach to selecting and storing sample values (and related/associated information) for later consideration, provide a very significant performance improvement over known prior art systems.

Additionally illustrated in FIG. 3 are a series of vertical line segments, including line segment 79, which are located below the horizontal axis 62. These line segments are representative of one possible set of sample or sampling intervals. The sampling intervals, or some integral number of contiguous sample intervals, may be employed in a number of ways to provide temporal information associated with the scan reflectance profile signal. First, since the relative width of each element must be ascertained to determine if the bar code indicia being evaluated is decodable, one simple approach that may be utilized to measure the relative width of each element is to count the samples processed from the first edge of an element to a next adjacent edge indicating the start of the next element (and the end of the current element). The resulting count would be proportional to the relative width of an element. This method could be employed for each element of the bar code indicia. Another feature that may be supported utilizing the counting of samples produced by the a/d converter 94 is to determine and store a time marker for each peak value determined. The time marker would indicate the relative temporal position of each of the peak values determined with respect to the boundaries of the element within which they (the peak values) occurred. That is, the time marker would indicate where the associated (corresponding) peak value occurred within the time interval measured for the element scanned. Accordingly, the time marker may be provided as a simple count, which when considered with respect to the width count, will indicate the relative temporal position or location of the corresponding peak. It is contemplated that the peak sample values and the time markers may be employed, by say, a post-processing computing unit, to recreate an approximate graphical representation of at least one portion of the scan reflectance profile (SRP) signal of the scanned indicia. For example, using the relative magnitude of each respective peak sample value determined, its corresponding time marker, and known interpolation and graphing techniques (e.g., graphical reconstruction methods known in the art), the reconstructed representation of the SRP, or a portion thereof, may be displayed via a display or CRT monitor or printed to provide a hardcopy of the SRP waveform. It is important to note that the graphically recreated portions of the SRP signal are an approximation of the original SRP signal, since the shape of the peak portions may not be "exactly" determined with the available peak sample values. This limitation is the result of not being able to accurately determine the exact shape of the curve at a peak location. That is, the rates of change of the slope of the SRP signal before and after the peak value are not determinable. However, a representative, approximate graphical representation of at least one portion of the scan reflectance profile signal of the scanned indicia may be recreated for display, printing, or storage. Those skilled in the art will appreciate the variety of methods available for determining relative element widths and (peak sample) time markers for the elements forming a bar code indicia. It should be understood that typically many more samples would be produced and processed (and possibly collected when using conventional evaluation methods) to accurately process a scan reflectance profile signal, and that the set of line segments shown in FIG. 3 are illustrative only.

Figure 4:
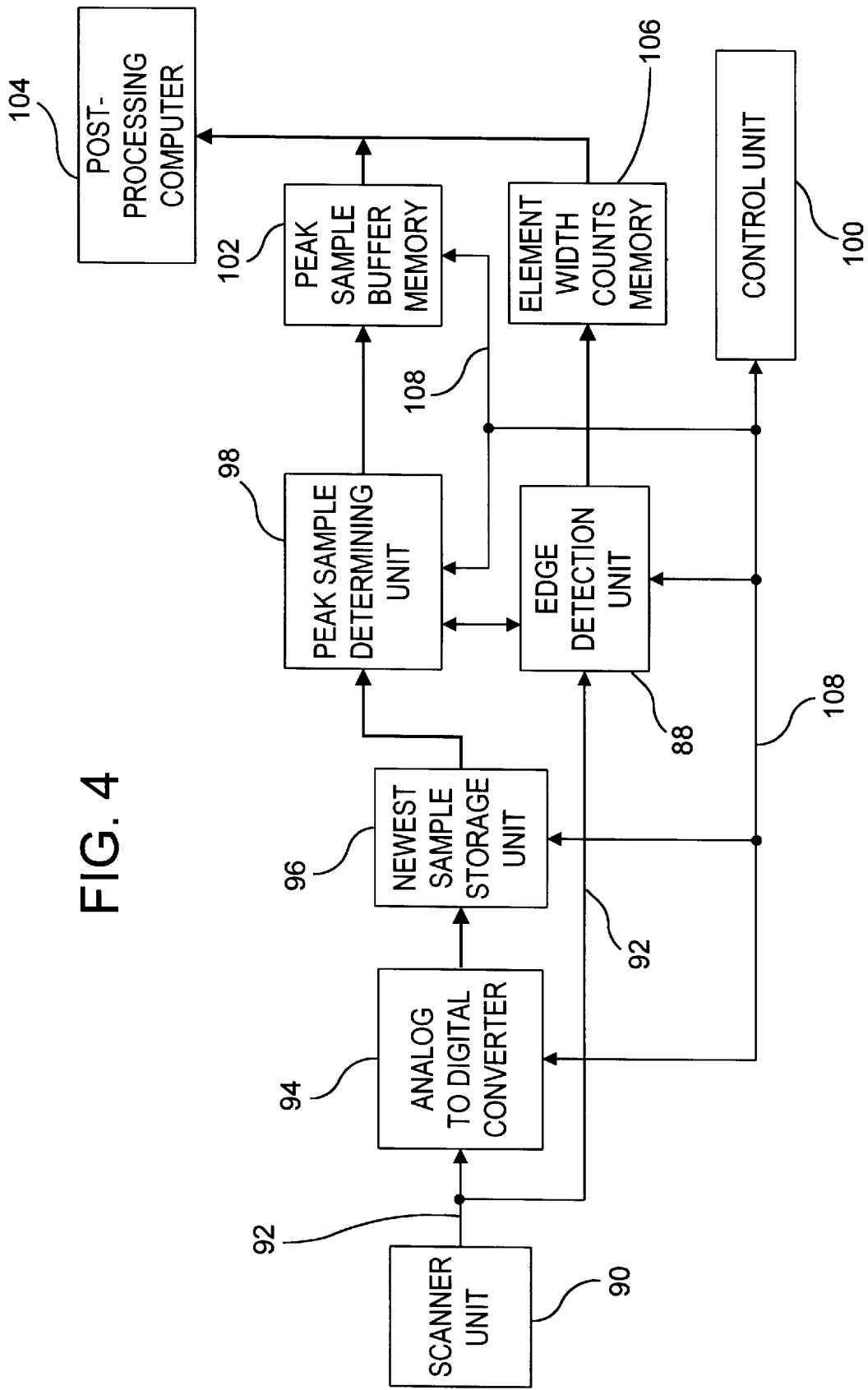
FIG. 4 is a high level block diagram for an embodiment of the invention.

Referring now to FIG. 4, an embodiment of the present invention is shown to evaluate the quality of a bar code indicia by processing a scan reflectance profile signal representative of the plurality of bars and spaces of the indicia. An important function provided by the embodiment of FIG. 4 is to determine at least one positive peak sample value and/or at least one negative peak sample value for each element of the indicia being evaluated. These peak sample values may then be post-processed to determine, for example, at least one figure of merit indicative of the quality of the indicia under evaluation.

A scan reflectance signal 92, as shown in FIG. 4, is generated by a scanner unit 90 that is typically provided by an optical scanning type device such as a laser scanner. An edge detection unit 88 monitors the scan reflectance signal 92 to detect the occurrence of an edge indicating the start of an element of the bar code indicia. The control bus 108 is provided to enable the various units of the embodiment of FIG. 4 to communicate (i.e. using handshake and control signals) and pass information, including command and control information, back and forth between units as required. For example, at the detection of a first edge of the scan reflectance signal 92, the edge detection unit 88 may signal the control unit 100 that an edge was detected. The control unit may be arranged to respond by initialing various components of the present embodiment (via the control bus 108) and to initiate sampling of the scan reflectance signal 92 by an analog-to-digital converter 94. Each sample produced by the analog-to-digital converter 94 is representative of the instantaneous analog value of the reflectance level of the element presently being scanned. As samples are produced they are loaded into a newest sample storage unit 96. It should be noted that the newest sample storage unit 96 may actually be incorporated into the analog-to-digital converter 94. A peak sample determining unit 98 determines if the current sample in the newest sample storage unit 96 is either a positive peak sample value or a negative peak sample value (of the level of reflectance) produced from the scan reflectance signal for that element. If the sample value is determined not to be either a positive or negative peak value, the value is not stored (i.e. collected) by the peak sample determining unit 98, and will be lost when the next sample is produced by the analog-to-digital converter 94 (and stored in the newest sample storage unit 96). However, if the present value in the newest sample storage unit 96 is determined to be a peak value, the current sample value in the newest sample storage unit 96 is loaded into the peak sample determining unit 98. At this time the peak value just determined may be stored in the peak sample buffer memory 102. This process will continue until the edge detection unit 88 detects a next edge indicative of the start of the next element (and the end of the current element). With the detection of an edge, the peak sample values determined for the current element (just scanned) may be made available for post-processing. It is contemplated that the post-processing of the peak values may commence (i.e. the processing of peak values already determined may be conducted), even while other peak values are being determined and stored. The process of sampling the scan reflectance signal 92 continues until all peak values have been determined for each element of the bar code indicia. The peak values determined by the peak sample determining unit 98, along with the relative widths of the elements, enable well known figures of merit indicative of the quality of the bar code indicia to be determined. In a most preferred embodiment of the invention, as each peak value is determined, the value is loaded into the peak sample buffer memory (such as the buffer memory 102 of FIG. 4) or provided directly to a post-processing computer 104.

As depicted in FIG. 4, the edge detection unit 88 of this embodiment is configured to further determine an element width count that is equal to the number of samples associated with each element. At the occurrence of an edge, indicating the end of an element, the element width count value may be loaded into an element width counts memory 106. The element width count values are typically used to determine the relative widths of the elements of the indicia being evaluated, and as such are useful for determining figures of merit associated with decode and decodability evaluation. It is possible to provide the width counting function with a separate unit interposed between the edge detection unit 88 and the element width counts memory 106. This alteration, along with others contemplated, are considered within the scope of the present invention. As addressed above, the determination and collection of time markers to establish the relative temporal position of each of the determined peak values within the portion of the SRP signal is also desired. This function may also be provided by the edge detection unit 88, or by the peak sample determining unit. For example, the counter (not shown) that may be included to determine the element width counts, may be arranged to be latched on the fly each time a peak sample is detected. Accordingly, a count (i.e. a time marker) would be collected each time a peak sample value is determined, along with the count for the total width of the scanned element.

It should be understood that it is also contemplated that the present invention may be arranged to eliminate the peak sample buffer memory 102 and/or the element width counts memory 106, and supply the peak values, the time markers, and the element width count values directly to a post-processing computer, such as the post-processing computer 104. Further, the functions provided by the peak sample buffer memory and the element width counts memory may be provided by one or more suitable memory units (that are well known in the art). In addition, a separate suitable memory unit may be employed to store the time markers separately from the peak sample values, as each item/value is determined. It must also be noted that the functions of the peak sample determining unit 98, the edge detection unit 88, and the peak sample buffer memory 102 of the embodiment of the FIG. 4 may be realized employing a hardware/software (or hardware/firmware) solution, such as an embodiment including a high speed digital signal processing (DSP) computer. In addition, the peak sample values determined for each element, along with the element width counts and time markers, may be output to a second (possibly DSP capable) computer system, such as an appropriate post-processing computer 104. Alternatively, a hardware embodiment may be employed to realize the present invention using digital logic functions implemented with standard integrated logic devices or programmable logic devices. A more detailed description of a logic based functional embodiment comprising digital logic functions will be addressed later. However, it should be understood that these logic functions may be implemented in software using suitable computing units (including available DSP processors). Indeed, with the current state of technology, a possibly most preferred embodiment contemplated, for both cost and highest speed considerations, is a hardware implementation employing digital logic functions to collect the peak sample values and/or element width count values for each element. The digital logic functions may be realized by discrete integrated devices (to provide individual logic functions required) or by a variety of programmable logic devices (PLDs) currently available. Skilled persons will recognize the variety of solutions available to implement the embodiments of FIGS. 4, 5A, and 5B.

Turning again to FIG. 4, there is provided a control unit 100. The control unit 100 is provided to coordinate the activities of the various units of the present embodiment. For example, when the edge detection unit 88 detects a first edge indicative of the start of the first element (a bar) of the bar code indicia, control unit 100 may signal (via control bus 108) for the analog-to-digital converter 94 to begin sampling the scan reflectance signal 92. Also, when an edge is detected by edge detection unit 88, control unit 100 may be arranged to enable (again via the control bus 108) the peak sample determining unit 98 to store the positive and/or negative peak sample values determined into the peak sample buffer memory 102. It should be understood that the control unit 100, which may also act as a clock source to clock various units included in the embodiment of FIG. 4, may be implemented using discrete or programmable logic devices (possibly including a high speed microcontroller type device).

Figure 5A:
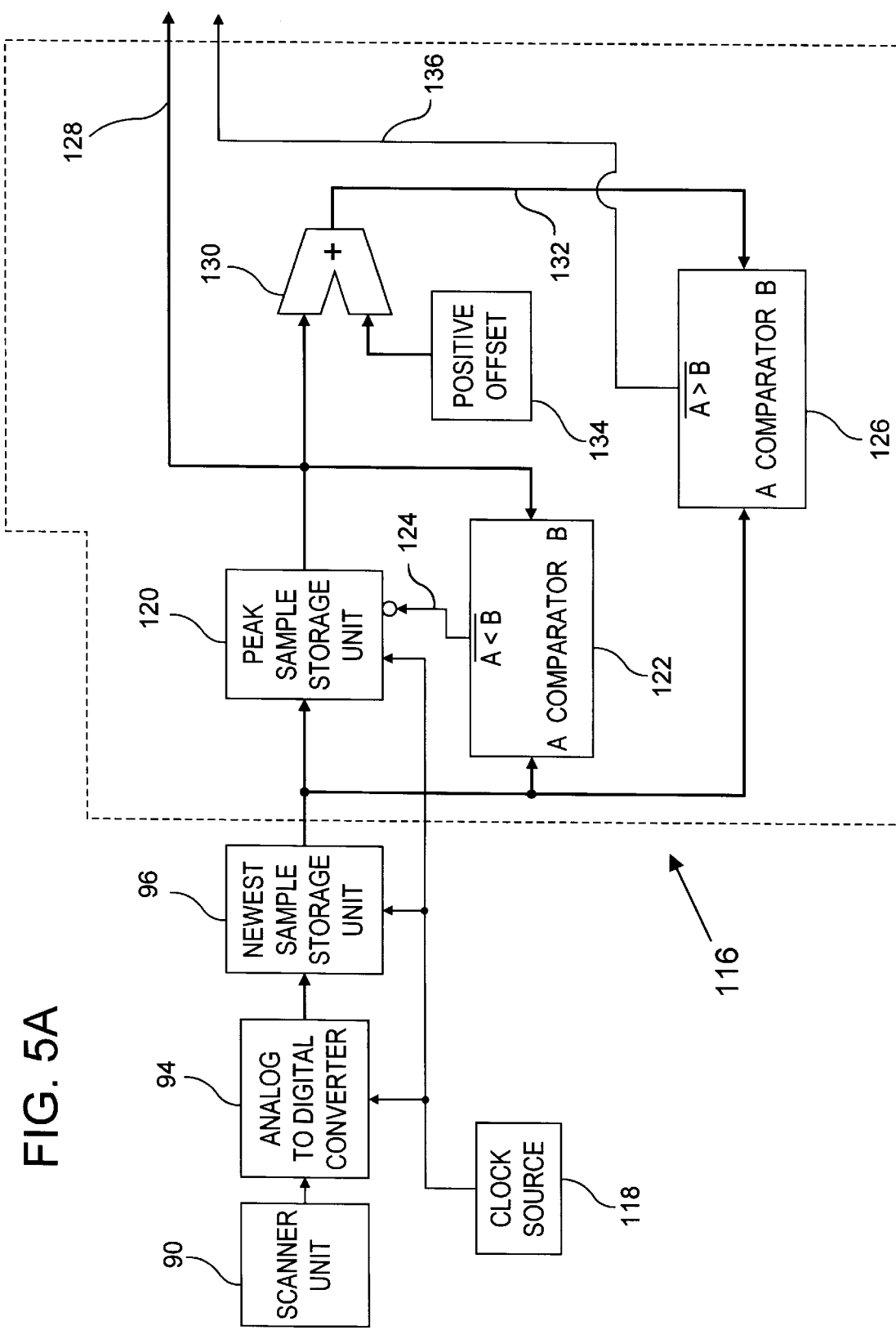
FIG. 5A is a functional block diagram of an embodiment of a negative peak determining unit to collect a negative peak sample value employing a digital peak detection approach.

Referring now to FIG. 5A, there is provided a functional block diagram of an embodiment of a negative peak determining unit 116 to determine negative peak sample values as they occur within a sequence of samples produced by the analog to digital converter 94. The functions of the scanner unit 90, the analog-to-digital converter 94 and the newest sample storage unit 96 are equivalent to the embodiment of FIG. 4. With this embodiment a clock source 118 is provided to clock the analog-to-digital converter 94 to produce samples and to further clock samples values into the newest sample storage unit 96, and selectively into a peak sample storage unit 120, as will be discussed. The peak sample storage unit 120 is responsive to a first comparator 122. The first comparator 122 is arranged to compare the relative magnitudes of the sample values stored in the peak sample storage unit 120 and the newest sample storage unit 96. Initially, the peak sample storage unit 120 would be set to the highest value that the analog-to-digital unit 94 can produce. As samples are produced by the analog-to-digital converter 94 and stored in the newest sample storage unit 96, the comparator 122 determines if the sample value of the newest sample storage unit 96 is less (lower) than the sample value stored in the peak sample storage unit 120. If the newest sample value is less than the value of the peak sample storage unit 120, the new sample may represent a new negative peak value. The first comparator 122 provides a first control signal 124 to enable the peak sample storage unit 120 so the new sample value is stored (if it is a lower value) in the peak sample storage unit 120. This process of storing lower valued samples in the peak sample storage unit 120 continues until a negative peak value is stored. At the point in time when the sample values produced by the analog-to-digital converter 96 begin to increase in relative magnitude when compared to the sample value stored in the peak sample storage unit 120 (i.e. after a negative peak occurs in the reflectance profile signal), a negative peak value has been determined and is now stored in the peak sample storage unit 120. At this point, the first control signal 124 no longer enables the peak sample storage unit 120, and the negative peak sample value stored in the peak storage unit 120 is preserved.

Due to the presence of noise, especially in digital electronic systems, a newest sample value may at any time be slightly larger than a previous sample. The next sample, or a later sample, may again be at a lower value than the sample value that is stored in the peak sample storage unit 120. In consideration of this possibility, a summing unit 130 is included in the embodiment of FIG. 5A to generate a threshold value 132. The threshold value 132 is equal to the sum of the sample value of the peak sample storage unit 120 and an appropriate positive offset 134. The value selected for the positive offset 134 is such that negates the affect of noise in the system with respect to determining when the sample values begin to actually increase in relative magnitude. At minimum the magnitude of the positive offset must be greater than the noise level of the system. Alternately, the positive offset may be dynamically varied, for example, as a percentage of the peak value. As shown in FIG. 5A, a second comparator 126 determines when the threshold value 132 is of a lower relative magnitude than the sample value of the newest sample storage unit 96. That is, the sample value in the newest sample storage unit 96 must rise to a high enough level, well above the noise level present in the system, so that the second comparator 126 does not falsely indicate via a second control signal 136, that a negative peak value has been determined. As a result the second comparator 126 produces an active value on the second control signal 136 (indicating a negative peak has been found) at a point in time after the peak sample value has been determined and stored in the peak storage unit 120. The value of the peak sample storage unit 120 may then be saved and/or compared to previous negative peak sample values to determine if it is a lowest negative peak sample value.

It should be noted that the second control signal 136 and the output 128 of the peak sample storage unit 120 of FIG. 5A may also be utilized along with a third comparator and an additional lowest peak storage unit (both not shown in FIG. 5A) to determine if the negative peak value just determined and stored in the peak sample storage unit 120 (and accessible on output 128) is indeed a lowest negative peak value. This arrangement will support the determination of a lowest negative peak value present in a succession of negative peak sample values.

Once a negative peak value has been determined by the embodiment of FIG. 5A, a second peak determining unit arranged to collect a positive peak sample value may be employed to determine the next positive peak. One skilled in the art will appreciate that every negative peak must be followed by a positive peak, and visa versa. Although minor peaks that are above the level of the threshold signal 132 may be missed if the threshold value 132 is set at too high a level, the impact on the peak samples collected and the associated figures of merit is not important as the most negative peak values will always be determined.

Referring now to FIG. 5B illustrated is a functional block diagram of an embodiment of a positive peak determining unit 116a to determine positive peak sample values. The structure and operation of the positive peak determining unit of FIG. 5B is very similar to that of the negative peak determining unit of FIG. 5A, with the exception that this embodiment is configured to determine positive peak values. The functions of the scanner unit 90, the analog-to-digital converter 94, the newest sample storage unit 96, and the clock source 118 are equivalent to the embodiment of FIG. 5A. A peak sample storage unit 120a is responsive to a first comparator 122a, which is arranged to compare the relative magnitudes of the sample values stored in the peak sample storage unit 120a and the newest sample storage unit 96. In order to determine the value of a positive peak, the peak sample storage unit 120a must initially be set to the lowest value that the analog-to-digital converter 94 can produce. As samples are generated by the analog-to-digital converter 94, the comparator 122a determines if the newest sample value stored in the newest sample storage unit 96 is greater (higher) than the value of the peak sample storage unit 120a. If the newest sample value is higher, the newest sample may represent a new positive peak value and the first comparator 122a provides a first control signal 124a to enable the peak sample storage unit 120a allowing the new sample value to be stored (in the peak sample storage unit 120a). This process of storing higher valued samples continues, until at point in time when the sample values produced by the analog-to-digital converter 96 begin to decrease in relative magnitude when compared to the sample value stored in the peak sample storage unit 120a (i.e. after a positive peak occurs). At this point a positive peak value has been determined and stored in the peak sample storage unit 120a, and the first control signal 124a no longer enables the peak sample storage unit 120. Therefore, as desired, the positive peak sample value stored in the peak storage unit 120a is latched and preserved.

Further provided with the embodiment of FIG. 5B is a summing unit 130 included, as with the embodiment of FIG. 5A, to provide noise immunity. However, in this embodiment the polarity of the offset value produced by the negative offset 134a, is negative. A second comparator 126a is arranged to determine when a threshold signal value 132a, now adjusted by the value of the negative offset 134a to be lower in magnitude then the value stored in the peak sample storage unit 120a, is higher than the magnitude of the sample value stored in the newest sample storage unit 96. Therefore, the sample value in the newest sample storage unit must drop to a low enough level (accounting for the system noise level), before a second comparator 126a provides a second control signal 136a to indicate a positive peak value has been determined. By using the second control signal 136a to indicate when a positive peak value has been determined, along with the output 128a of the peak sample storage unit 120a, the value of peak sample storage unit may be saved and/or compared to a previous positive peak value to determine if the value of the peak sample storage unit is a new highest positive peak sample value (of one or more positive peaks values previously determined).

An astute observer, and certainly one skilled in the art, will notice the redundancy of the embodiments of FIG. 5A and FIG. 5B. For example, with the exceptions of the "sense" of the comparisons provided by the first and second comparators, and the sign of the offset value, these two embodiments are equivalent. It should therefore be possible to combine the embodiments of FIGS. 5A and 5B to provided an embodiment which can alternately determine negative sample values and positive sample values, and in the process reduce the redundancy of the embodiments of FIG. 5A and FIG. 5B. In addition, by using the control signals 136 and 136a of FIGS. 5A and 5B, respectively, additional units (i.e. storage and comparator units) may be added to determine and store the highest positive and lowest negative peak sample values for an element.

Figure 5C:
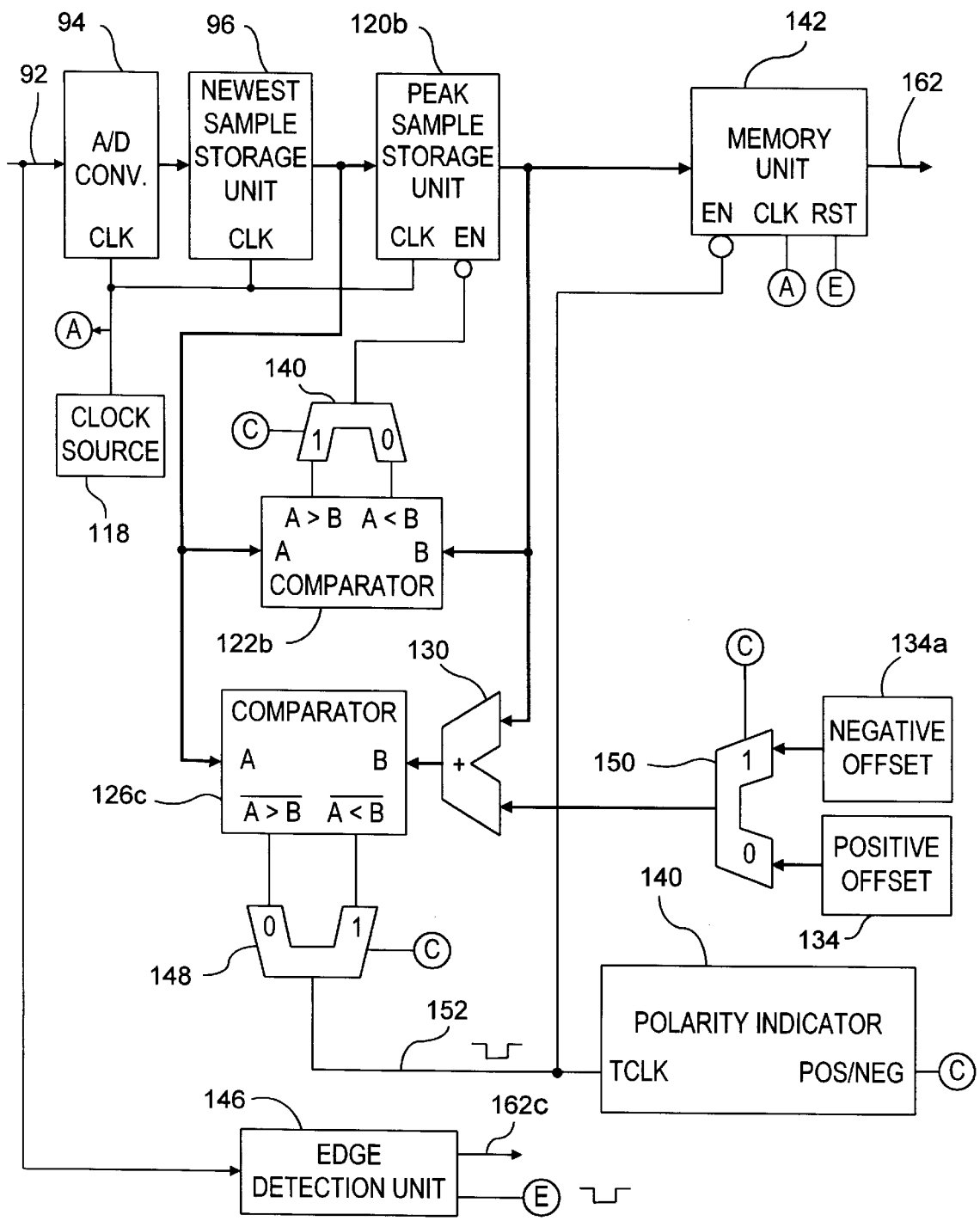
FIG. 5C provides a functional block diagram of an embodiment of the invention for determining the peak sample values occurring within a scan reflectance signal representative of the elements of a bar code indicia.

Referring now to FIG. 5C there is provided a functional block diagram of an embodiment of the invention for determining positive peak sample values and negative peak sample values of a scan reflectance signal representative of an element of a bar code indicia. One full cycle of operation of this embodiment will determine at least one peak value, said peak value determined being one of either a negative peak sample value or a positive peak sample value. Once a peak value has been determined, it is immediately accessible for post-processing (either directly or via a buffer memory such as a FIFO memory) to determine at least one figure of merit indicative of the quality of the scanned bar code indicia.

Turning again to FIG. 5C, central to this embodiment is a polarity indicator 140 having at least one output signal C. Output signal C may be assumed to be digital in nature and switchable between a low logic level and a high logic level. Signal C will configure the embodiment of FIG. 5C to alternately determine negative peak sample values and positive peak sample values as sample values are processed. To clearly understand the operation of the embodiment of FIG. 5C, it is important to understand the required initial conditions of various items included with the embodiment. First the signal C is set to a low logic level. Second, the memory unit 142 may be cleared or more generally initialized to known initial values. Also, although the peak sample storage unit 120b is shown in a simplified form, it should be understood that the peak sample storage unit of the embodiment of FIG. 5C must be capable of being initialized, as required. For example, after a (positive) peak has been determined, the peak sample storage unit may be initialized to the value of the current sample just produced by the A/D converter 94. To simplify the FIG. 5C embodiment, the peak sample storage unit is shown in a basic form. However, a skilled person would be able to add the required logic (via either hardware or software) to provide for the proper initializing of the peak sample storage unit 120b. At the start of the analysis of a bar code indicia, the peak sample storage unit 120b may be initialized to determine a negative peak value. As negative or positive peak sample values are determined, the peak sample storage unit 120b would be reloaded with the appropriate initial values. Further, in a hardware implementation the initializing of the peak sample value unit 120b would easily be supported by logic signals such as signals A, C, and a third signal E, provided by an edge detection unit 146. Skilled individuals may provide additional circuitry, as required, to provide other suitable control signals needed for the operation of similar embodiments.

As the scan reflectance signal 92 is generated by a scanner unit (not shown in FIG. 5C), an edge detection unit 146 monitors the scan reflectance signal 92 to detect the occurrence of a first edge indicating the start of an element of the bar code indicia. At the occurrence of the first edge an indication of the (edge) event may be provided by signal E to possibly initialize the peak sample storage unit 120b, and the memory unit 142, with the appropriate initial values. After signal E is provided, as each new sample is stored in the newest sample storage unit 96, first comparator 122b compares the value of the new sample to the value of the sample in the peak storage unit 120b. Comparator 122b produces a pair of control signals, one indicating if the new sample value is "greater than" the value in the peak sample storage unit 120b and a second indicating if the value is "less than" the respective values. A first multiplexer 140 is arranged to couple the appropriate signal, either the "A greater than B" or the "A less than B" signal, to enable the peak sample storage register 120b. For example, when determining a negative peak sample value, signal C would be at a low logic level and configure the first multiplexer 140 to couple the "A less than B" control signal to enable the peak sample storage unit 120b. As samples are produced and processed, new sample values would update the peak sample storage unit 120b when new lower sample values are determined. Thus, as with the embodiments of FIGS. 5A and 5B, the peak sample storage unit is responsive to the first comparator in that the decision as to update or not update the peak sample storage unit 120b is made by the first comparator 122b (via the first multiplexer 140).

The functions provided by the second comparator 126c, the summing unit 130 and the offsets 134 and 134a are equivalent to those discussed for the embodiments of FIGS. 5A and 5B. Additionally included in the embodiment of FIG. 5C are a second multiplexer 148 and a third multiplexer 150. The second multiplexer 148 is provided to selectively couple either a "greater than" or a "less than" control signal produced by the second comparator 126c (to various components of the present embodiment) as determined by signal C. When determining a negative peak sample value the "A greater than B" control signal provided by the second comparator 126c is coupled to these components, and when determining a positive peak sample value the "A less than B" control signal from the second comparator 126c is coupled. Similarly, the third multiplexer 150 couples the positive offset 134 or the negative offset 134a, respectively, to summing unit 130. The control signal 152 provided by multiplexer 148 is used for several purposes. (Functionally, this signal is equivalent to the signals 136 and 136b of FIGS. 5A and 5b, in that the signal indicates when a peak sample value has be determined.) A first use of control signal 152 is to clock or trigger the polarity indicator 140, and may be assumed to provide a "pulse" when a peak value is determined. Thus, when a negative or positive peak sample value has been determined, the polarity unit is toggled to configure the embodiment of FIG. 5C to search for a peak of opposite polarity to the peak just determined. Also control signal 152 is to enable (and clock) the memory unit 142 to store the peak value just determined. The peak value may then be provided via 162 to a post-processing computer (not shown).

At a point in time when the edge detection unit 146 detects an edge indicating the end of the present element (just sampled and processed) the value or values stored in the memory unit 142, which may be provided by a FIFO memory device, may be immediately made available and accessed for post-processing. Alternately, each peak value determined may be made available, one at a time as they are determined, for post-processing. The control signal 162c as provided by the edge detection unit 146 may be employed to indicate the end of scanning for an element and that the one or more peak values have been determined, and are associated with that element. Alternately, the signal 162c may be used to generate an "interrupt signal" (well known in the art) to post-process the samples just determined and presently loaded in the memory unit 142. Skilled individuals will appreciate many variations are possible to provide equivalent (functional) embodiments of the FIG. 5C embodiment. Also, it must be understood that the embodiment of FIG. 5C is provided in a simplified form to support a clear and concise description of the basic features and characteristics of the embodiment.

Regardless of how determined peak samples are stored and/or accessed by the post-processing computer, the processing of samples representative of the next element would then commence by initializing the various storage units to the appropriate initial values, and sequentially processing the next group of samples to determine peak values for that next element (which is now being scanned). This activity would continue until all elements of the indicia have been scanned, sampled and processed.

It should be noted that the embodiment of FIG. 5C is intended to be representative of implementations which may be provided by hardware based embodiments, or by hardware/software (or hardware/firmware) based solutions. For example, functionally equivalent embodiments of the invention are contemplated that incorporate digital signal processing circuitry, possibly including, for example, known integrated circuit DSP processors. Indeed, skilled persons will understand the variety of such implementations available in the art. A preferred embodiment of the present invention may be implemented with a Personal Computer (PC) having an expansion plug-in card. The expansion plug-in card including an implementation of the embodiment of FIG. 5C, or an equivalent. The PC would then serve as a post-processing computer. Yet other stand-alone embodiments, utilizing an embedded computing unit are possible. It is contemplated that the present invention includes all such embodiments that process in (near) real-time sample values produced from a scan reflectance signal to determine peak sample values for each element of a bar code indicia, wherein the peak sample values determined are post-processed (along with width counts and other information for each element) to determine at least one figure of merit indicative of the quality of the indicia.

Figure 6A:
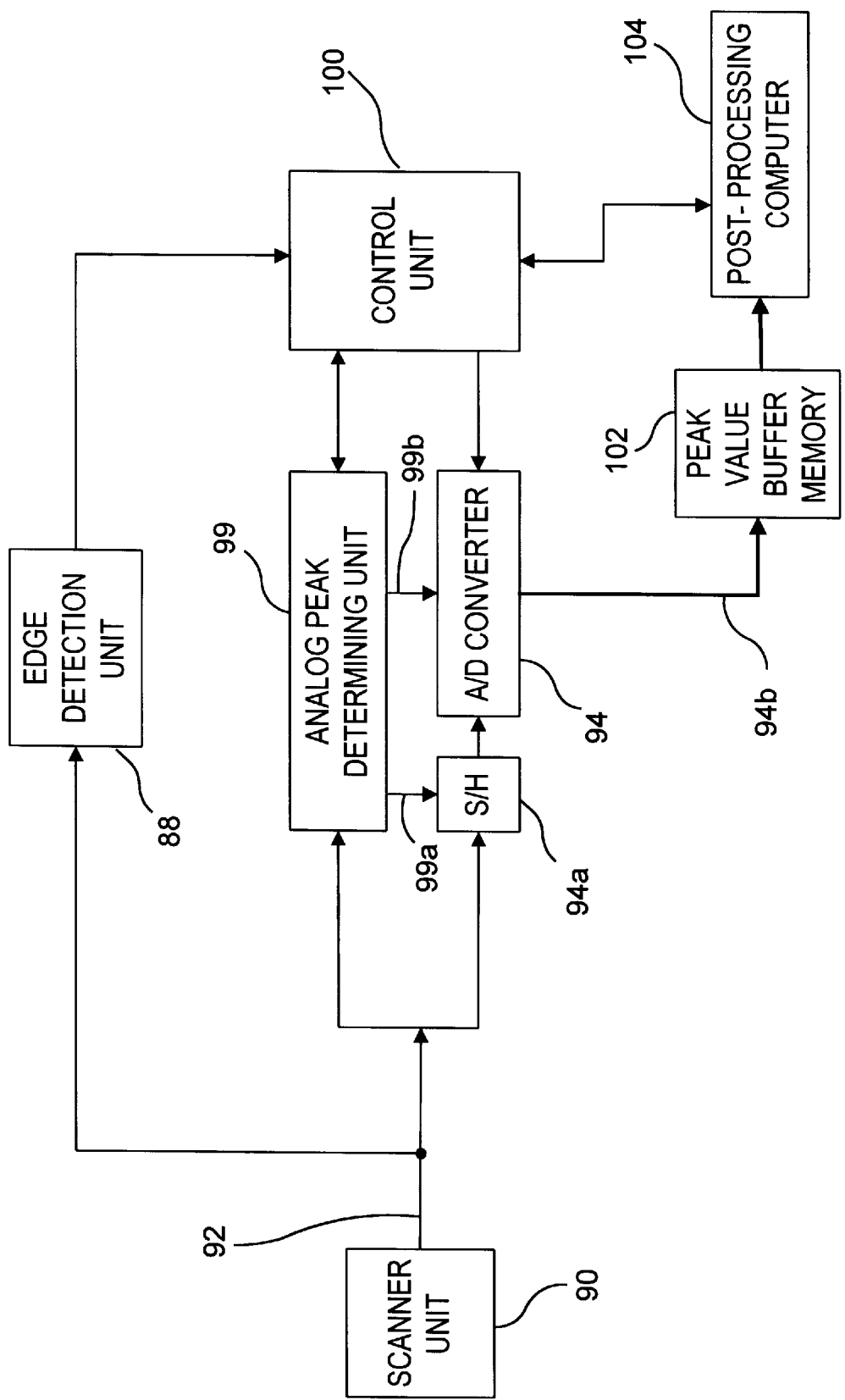
FIG. 6A provides a functional block diagram of an embodiment of the invention for determining the peak sample values occurring within a scan reflectance profile signal employing an analog peak detection approach to collect the peak sample values.

Referring now to FIG. 6A there is provided an embodiment of the invention using an analog (signal) processing approach to determining the peak sample values occurring in the scan reflectance profile signal 92 generated by the scanner unit 90. As with the embodiment of FIG. 4, an edge detection unit 88 and a control unit 100 are provided. These units provide essentially the same functions as discussed with the FIG. 4 embodiment. Accordingly, the edge detection unit 88 monitors the scan reflectance signal 92 to detect occurrences of edges indicating the start (and possibly the end) of respective elements of the bar code indicia, while the control unit 100 coordinated the activities of the various components and units of the invention.

A key provision of the embodiment of FIG. 6A is the analog peak determining unit 99. The function of this unit is to determine the instant a peak value (either positive or negative) occurs. At that point in time the analog peak detection unit 99 may capture the signal by signaling a sample and hold circuit 94a via signal 99a. Also, a conversion may be started using the analog-to-digital (a/d) converter 94 to determine the associated (digital) sample value for the peak stored in the s/h circuit 94a. During the conversion, the analog peak detection unit 99 may be re-initialized to determine the occurrence of the next peak value. Once the conversion of the peak value is complete, the "sample" value (representative of the peak value) may be loaded into the peak value buffer memory 102, or alternately be made directly available to the post-processing computer 104. The analog peak determining unit 99, which may include the necessary circuitry to determine when an edge (i.e. the end of an element) occurs, would continue to determine peak values until the occurrence of the edge is detected. The edge would be noted as necessary (to possibly group the peaks collected), and the next element would be processed in the same fashion. The process would continue until all elements have been scanned and analyzed, and all occurring peak values have been determined.

An advantage of the embodiment of FIG. 6A is the reduced conversion speed requirement for the a/d converter 94, while still supporting high speed evaluation. As it is no longer necessary to sample and digitize the entire scan reflectance profile signal 92 in real-time to determine the peak values (as was the case with the embodiment of FIG. 4), the a/d converter 94 now has a significantly longer time to determine the digital equivalent representation of the value of the peak.

It must also be noted that the sample/hold circuit 94a, and the associated functionality, may actually be incorporated into the analog-to-digital converter 94. Skilled individuals will appreciate the number of available devices to provide the functions of the sample/hold circuit 94a, the analog-to-digital converter 94, and the analog peak determining unit 99.

Figure 6B:
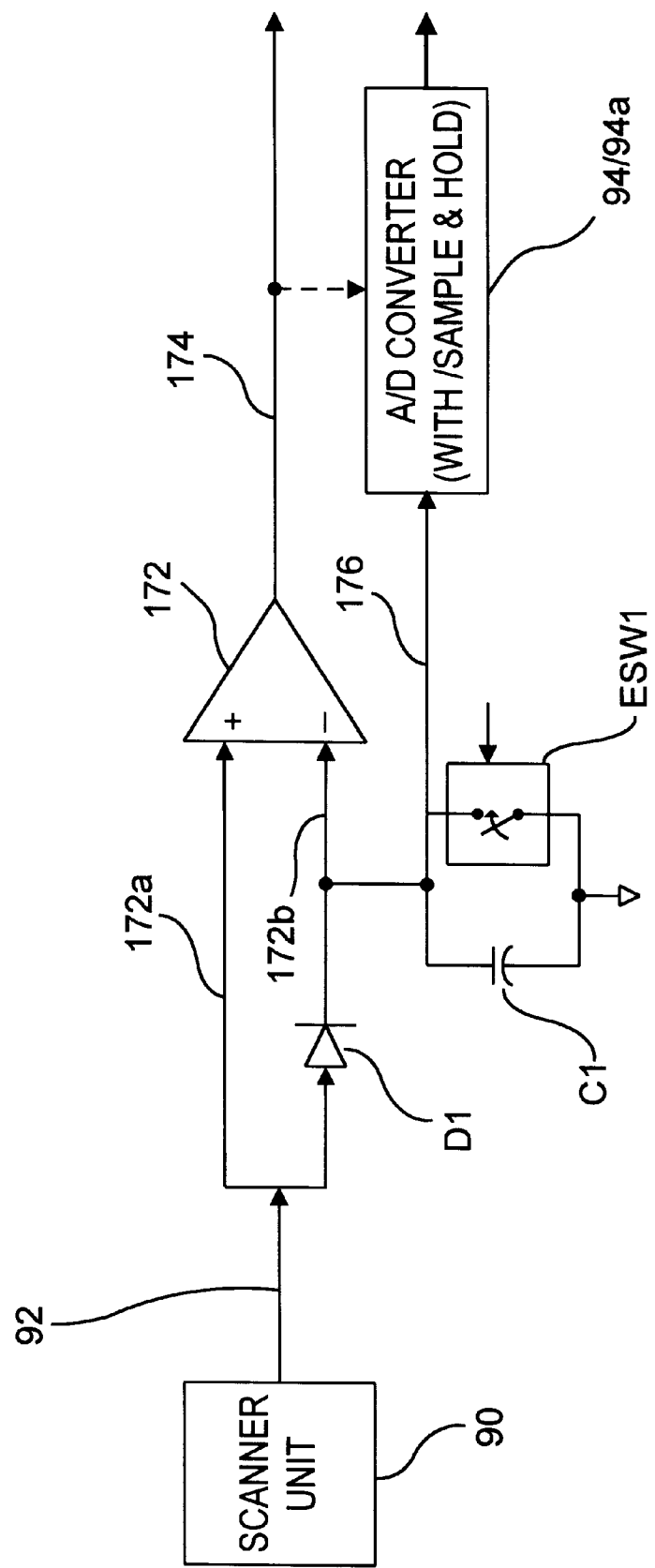
FIG. 6B is a functional block diagram of an embodiment of a positive peak determining unit employing an analog peak detection approach to collect a positive peak sample value.

Turning now to FIG. 6B, there is provided a simple circuit to determine analog positive peak (sample) values occurring in the scan reflectance profile signal 92. The analog value of the signal 92 is provided to a comparator 172 via two inputs, a plus input 172a and a minus input 172b. Input 172a receives the signal 92 directly, while the input 172b receives the signal 92 via a series diode D1. Accordingly, as the signal 92 is increasing in amplitude (i.e. approaching a positive peak value), there will be approximately a one diode voltage drop difference between the two inputs. The signal provided via the diode D1 is used to charge holding capacitor C1. Once the signal 92 reaches the peak value (stored in C1) and begins to drop the output 174 of comparator 172 will generate an edge (e.g. switch from one level to a second level) and the conversion of the signal value stored in C1 may commence. The function of electronic switch ESW1 is to reset the capacitor to zero (or another suitable initial value) after the a/d converter and sample/hold circuits 94/94a have captured and began to convert the peak signal value to produce a representative digital (sample) value.

It should be noted that other arrangements are known in the art, as may be provided by skilled persons, to capture positive and negative peak values. The arrangements provided in FIGS. 6A and 6B are presented in a simplified form to clearly define the function to be conducted with analog (possibly mixed mode) circuitry, and are intended to be illustrative only.

While there have been described the currently preferred embodiments of the present invention, those skilled in the art will recognize that other and further modifications may be made without departing from the invention and it is intended to claim all modifications and variations as fall within the scope of the invention and the appended claims.

What is claimed is:

1. A method for evaluating the quality of a bar code indicia by processing a scan reflectance profile signal representative of elements of the bar code indicia, the scan reflectance profile signal generated by scanning the bar code indicia, the method comprising the steps of:
    a) detecting a first edge of the scan reflectance signal as the bar code indicia is being scanned, the first edge indicating the beginning of a first element of the bar code indicia;
    b) sampling a portion of the scan reflectance signal representative of the element producing a sequence of sample values;
    c) processing the sequence of sample values of step b) as each sample is produced to determine all occurring positive and negative peak sample values found within the sequence of sample values associated with the element being scanned and sampled, thereby determining all peak sample values occurring within the scan reflectance profile signal for the scanned element;
    d) detecting a next edge of the scan reflectance signal indicating the end of the element and the start of the scanning and sampling of an adjacent element;
    e) making available the peak sample values, as they are determined, for post-processing; and
    f) repeating steps b), c), d) and e) for a plurality of adjacent elements that along with the first processed element form the bar code indicia being evaluated;
    g) the peak sample values determined for each element scanned being accessible for post-processing to determine at least one figure of merit associated with the quality of the bar code indicia.

2. The method according to claim 1, wherein the peak samples determined in step c) are stored in a peak sample buffer memory from which the peak sample values are accessible for post-processing.

3. The method according to claim 2, further comprising the step of post-processing the peak sample values collected for each element of the bar code indicia to determine at least one figure of merit indicative of the quality of the bar code indicia being evaluated.

4. The method according to claim 1, wherein a plurality of scan reflectance profile signals, which are generated by scanning the bar code indicia at spaced locations along the height of the elements of the indicia, are processed in succession to determine the peak sample values for each element of the indicia for each of the scan reflectance signals generated.

5. The method according to claim 4, further comprising the step of post-processing the positive and negative peak sample values determined for each element of each scan reflectance profile signal processed to determine at least one figure of merit indicative of the overall quality of the bar code indicia being evaluated.

6. The method according to claim 1, wherein detecting an edge within the scan reflectance signal in step d), causes an element width count to be stored in an element width buffer memory; the storing of element width counts occurring with each subsequent edge detected until all portions of the scan reflectance profile signal representative of the elements of the indicia are processed, such that the element width count values are available as they are determined to support the determining of the at least one figure of merit.

7. A method for evaluating the quality of a bar code indicia by processing a scan reflectance profile signal representative of the elements of the bar code indicia, the scan reflectance profile signal generated by scanning the bar code indicia, the method comprising the steps of:
    a) sampling the scan reflectance signal thereby providing a sequence of sample values representative of each element of the bar code indicia;
    b) processing each sample value of the sequence of sample values as each sample is produced in step a); and
    c) determining at least one of a positive peak sample value and a negative peak sample value from the samples produced for each element of the bar code indicia that is scanned;
    thereby determining at least one peak value for each element scanned, with each peak value determined being immediately accessible for post-processing to determine at least one figure of merit indicative of the quality of the scanned bar code indicia.

8. The method according to claim 7, wherein a time marker is further provided in step c) for each peak value determined, the time markers indicating the relative temporal position of each of the determined peak values within the portion of the scan reflectance profile signal representative of the scanned element.

9. The method according to claim 8, further comprising the step of storing peak sample values and the associated time markers in a memory unit as they are determined in step c).

10. The method according to claim 9, further comprising the step of post-processing the peak sample values to determine the figure of merit.

11. The method according to claim 9, further comprising the step of post-processing the peak sample values and the time markers to recreate an approximate graphical representation of at least one portion of the scan reflectance profile signal of the scanned indicia.

12. The method according to claim 7, further providing for the grouping of the peak values determined in step c) for each element scanned, thereby enabling each group of peaks values determined for each scanned element to be readily associated with the respective element.

13. The method according to claim 12, wherein a time marker is provided for each peak value determined, the time markers indicating the relative temporal position of each respective peak value within the portion of the scan reflectance profile signal representative of the scanned element; the grouping for each element including each peak value determined, along with the associated time marker.

14. An apparatus for supporting the high speed evaluation of the quality of a bar code indicia by processing a scan reflectance profile signal representative of elements of the bar code indicia, the scan reflectance profile signal processed as it is generated by a scanner unit arranged to scan the indicia, the apparatus comprising:

an analog-to-digital converter to sample the scan reflectance profile signal as the scan reflectance profile signal is generated by the scanner unit, the analog-to-digital converter producing a sequence of samples, each sample having a value representative of the instantaneous analog value of the scan reflectance profile signal;

an edge detection unit to detect edges within the scan reflectance profile signal, the edges indicating the start of each element within the bar code indicia and the sequence of sample values associated with respective elements; and a peak sample determining unit that is operatively coupled to the analog-to-digital converter, the peak sample determining unit provided to determine all occurring peak sample values, for each element, from the sample values produced by the analog-to-digital converter as each element of the bar code indicia is scanned;

the peak samples determined for each element already scanned being immediately accessible to begin post-processing to determine at least one figure of merit indicative of the quality of the bar code indicia being evaluated.

15. The apparatus according to claim 14, further comprising a post-processing computer to read and post-process the peak sample values as they are produced to determine the figure of merit.

16. The apparatus according to claim 14, further comprising a peak sample buffer memory to store the peak sample values as the values are determined by the peak sample determining unit.

17. The apparatus according to claim 16, further comprising a post-processing computer to read and post-process the peak sample values stored in the peak sample buffer memory.

18. The apparatus according to claim 14, wherein the peak sample determining unit further provides a time marker for each peak sample value determined; each time marker indicating the relative temporal position of each peak sample value determined within the portion of the scan reflectance profile signal representative of each scanned element.

19. The apparatus according to claim 18, further comprising a post-processing computer to post-process the peak sample values and the associated time markers to recreate an approximate graphical representation of at least one portion of the scan reflectance profile signal of the scanned indicia.

20. An apparatus for evaluating the quality of a bar code indicia by processing a scan reflectance profile signal representative of elements within the bar code indicia, the scan reflectance profile signal generated by a scanner unit and sampled by an analog-to-digital converter to produce a sequence of samples, each sample representative of the instantaneous analog value of the scan reflectance signal, the apparatus comprising:

an edge detection unit to detect edges within the scan reflectance profile signal, the edges indicating the start of elements of the bar code indicia; and a peak sample determining unit operatively coupled to the analog-to-digital converter; the peak sample determining unit provided to determine, for each element scanned, all occurring peak sample values and a corresponding time marker indicating the relative temporal position of each determined peak value within the portion of the scan reflectance profile signal representative of the scanned element; the peak sample values and the time markers determined from the sample values produced by the analog-to-digital converter as each element within the bar code indicia is scanned;

the peak sample values and time markers determined for already scanned and processed elements accessible to begin post-processing to determine at least one figure of merit indicative of the quality of the bar code indicia.

21. The apparatus according to claim 20, further comprising at least one buffer memory to store the peak sample values and the time markers determined for each scanned element until at least one of the peak sample values, and the time markers, are needed for post-processing.

22. The apparatus according to claim 21, further comprising a post-processing computer to post-process the peak sample values collected to determine the figure of merit.

23. The apparatus according to claim 21, further comprising a post-processing computer to post-process the peak sample values and the associated time markers to recreate an approximate graphical representation of at least one portion of the scan reflectance profile signal of the scanned indicia.

24. An apparatus to support the evaluation of the quality of a bar code indicia by processing a scan reflectance profile signal representative of the elements within the indicia as the scan reflectance profile signal is generated to determine occurring peak sample values for each element scanned within the indicia, the apparatus comprising:

an analog-to-digital converter to sample the scan reflectance profile signal as the scan reflectance profile signal is generated by the scanner unit, the analog-to-digital converter thereby producing a sequence of sample values representative of the instantaneous analog value of the scan reflectance profile signal at a plurality of spaced locations along the scan reflectance profile signal;

an edge detection unit to detect edges within the scan reflectance profile signal; the edges indicating the beginning of elements of the bar code indicia, and further indicating the end of each just scanned element and when at least one peak sample value has been determined for the element;

a polarity indicator to indicate a polarity of a peak sample value to next be determined, the polarity being indicated by a first logic level when determining a positive peak sample value and a second logic level when determining a negative peak sample value; and a peak sample determining unit to determine the peak sample values from the sample values provided by the analog-to-digital converter as each element within the bar code indicia is scanned, the peak sample determining unit having:

a first comparator;

a peak sample storage unit responsive to the first comparator; the first comparator producing a first control signal to enable the peak sample storage unit to store a current sample produced by the analog-to-digital converter if the current sample value is of the proper relative magnitude so as to represent a possible new peak value with respect to the polarity indicated by the polarity indicator;

a second comparator for comparing the relative magnitude of the current sample to the relative magnitude of a value being equal to a sum of the sample value currently stored in the peak sample storage unit and an offset value; the second comparator indicating when a peak value has been determined and providing a second control signal to the polarity indicator to configure the peak sample determining unit to determine a peak of opposite polarity to the peak just determined; and a peak storage unit, responsive to the second comparator, to store the peak sample value determined;

each peak sample value stored in the peak storage unit being determined from the sequence of sample values produced by the analog-to-digital converter as each element of the bar code indicia is scanned and sampled.

25. The apparatus according to claim 24, further comprising a memory unit to hold the peak sample values determined for each scanned element of the bar code indicia until the peak sample values are needed for post-processing.

26. The apparatus according to claim 25, further comprising a post-processing computer to receive and post-process the peak sample values to determine at least one figure of merit indicative of the quality of the bar code indicia.

27. The apparatus according to claim 24, wherein the peak sample determining unit further includes means for providing a time marker for each peak sample value determined; each time marker indicating the relative temporal position of each peak value within the portion of the scan reflectance profile signal representative of each scanned element.

28. The apparatus according to claim 27, further comprising a post-processing computer to post-process the peak sample values and the associated time markers to recreate an approximate graphical representation of at least one portion of the scan reflectance profile signal of the scanned indicia.

29. An apparatus to process a sequence of sample values representative of at least a portion of a scan reflectance profile signal generated by a scanner unit scanning elements of a bar code indicia, the sample values produced by an analog-to-digital converter arranged to sample the scan reflectance profile signal as the scan reflectance profile signal is generated by the scanner unit, the apparatus processing each sample of the sequence of sample values, as each sample is produced, to determine all occurring peak sample values for each element as each element is scanned, the apparatus comprising:

a polarity indicator having an output to indicate a polarity of a peak sample value to be determined, the polarity being indicated by a first logic level of the output when determining a positive peak sample value and a second logic level of the output when determining a negative peak sample value;

a peak sample storage unit, responsive to a first comparator, the first comparator producing a first control signal to enable the peak sample storage unit to store a current sample produced by the analog-to-digital converter if the current sample is of a proper relative magnitude so as to represent a possible new peak sample value with respect to the polarity indicated by the polarity indicator;

a second comparator for comparing the relative magnitude of the current sample to the relative magnitude of a value being equal to a sum of the sample value currently stored in the peak sample storage unit and an offset value, the second comparator indicating when a peak value has been determined and providing a second control signal to the polarity indicator to configure the apparatus to determine a peak of opposite polarity to the peak just determined; and a peak sample storage unit to store the peak sample value until the sample value is needed for at least one of being read, being stored, and being processed; each of the peak sample values being determined from the sequence of sample values produced by the analog-to-digital converter as each element of the bar code indicia is scanned;

the polarity indicator configuring the apparatus to alternately determine opposite polarity peak values until the sequence of sample values representative of each element has been processed and all the peak sample values have been determined.

* * * * *